US012235566B2

(12) United States Patent
Liu et al.

(10) Patent No.: US 12,235,566 B2
(45) Date of Patent: Feb. 25, 2025

(54) DOUBLE CHAMBER CAMERA

(71) Applicant: ZHEJIANG DAHUA TECHNOLOGY CO., LTD., Hangzhou (CN)

(72) Inventors: Zhanlong Liu, Hangzhou (CN); Yiwei Li, Hangzhou (CN); Aijun She, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 188 days.

(21) Appl. No.: 17/978,996

(22) Filed: Nov. 2, 2022

(65) Prior Publication Data
US 2023/0052063 A1 Feb. 16, 2023

Related U.S. Application Data

(63) Continuation of application No. PCT/CN2020/136873, filed on Dec. 16, 2020.

(30) Foreign Application Priority Data

May 6, 2020 (CN) .......................... 202020730845.7

(51) Int. Cl.
G03B 17/02 (2021.01)
G03B 5/00 (2021.01)
(Continued)

(52) U.S. Cl.
CPC ............... *G03B 17/02* (2013.01); *G03B 5/00* (2013.01); *G03B 37/04* (2013.01); *H04N 23/51* (2023.01);
(Continued)

(58) Field of Classification Search
CPC ..... G08B 13/1963; H04N 23/695; H04N 7/18
See application file for complete search history.

(56) References Cited

U.S. PATENT DOCUMENTS 5,598,207 A * 1/1997 Kormos ................ F16M 11/10
348/148
2003/0185419 A1 10/2003 Sumitomo
(Continued)

FOREIGN PATENT DOCUMENTS

CN 107864339 A 3/2018
CN 207926715 U 9/2018
(Continued)

OTHER PUBLICATIONS

European Search Report, European Application No. 20934702.0, mailed May 26, 2023 (51 pages).
(Continued)

*Primary Examiner* — Noam Reisner

(57) ABSTRACT

A double chamber camera is provided. The double chamber camera may include: a housing having an upper chamber and a lower chamber; and an upper chamber assembly arranged in the upper chamber, and a lower chamber assembly arranged in the lower chamber. The upper chamber assembly may include a first monitoring lens and a first transmission module. The first monitoring lens may be a zoom lens. The first transmission module may include a first support and a second support rotatably matched with the first support, a first driving unit configured to drive the first support to rotate along a first direction, and a second driving unit configured to driving the second support to rotate along a second direction. The first monitoring lens may be fixed on the first support or the second support.

19 Claims, 4 Drawing Sheets

(51) Int. Cl.
    *G03B 37/04*       (2021.01)
    *H04N 23/51*       (2023.01)
    *H04N 23/55*       (2023.01)

(52) U.S. Cl.
    CPC ..... *H04N 23/55* (2023.01); *G03B 2205/0046* (2013.01)

(56) References Cited

U.S. PATENT DOCUMENTS

| | | | | |
|---|---|---|---|---|
| 2005/0111696 | A1* | 5/2005 | Baer | H04N 7/188 |
| | | | | 382/218 |
| 2015/0070494 | A1* | 3/2015 | Hess, Jr. | H04N 23/611 |
| | | | | 348/143 |
| 2020/0366871 | A1* | 11/2020 | Cury | G03B 17/08 |
| 2022/0006925 | A1* | 1/2022 | Xu | G03B 15/03 |

FOREIGN PATENT DOCUMENTS

| | | | | |
|---|---|---|---|---|
| CN | 208094669 | U | 11/2018 | |
| CN | 208094671 | U | 11/2018 | |
| CN | 110320730 | A | 10/2019 | |
| CN | 211880479 | U | 11/2020 | |
| WO | WO-2019184578 | A1 * | 10/2019 | ............ G03B 17/12 |
| WO | 2019238100 | A1 | 12/2019 | |

OTHER PUBLICATIONS

International Search Report, International Application No. PCT/CN2020/136873, mailed Mar. 16, 2021 (9 pages).
European Examination Report, European Application No. 20934702.0, mailed Oct. 24, 2024 (4 pages).

* cited by examiner

DOUBLE CHAMBER CAMERA

CROSS REFERENCE TO RELATED APPLICATIONS

This application is a continuation of International (PCT) Patent Application No. PCT/CN2020/136873 filed on Dec. 16, 2020, which claims foreign priority to Chinese Patent Application No. 202020730845.7, filed on May 6, 2020, the contents of which are herein incorporated by reference in their entireties.

FIELD

The described embodiments relate to a camera technology, and more particularly, to a double chamber camera.

BACKGROUND

An intelligent integrated camera refers to a camera that can capture and capture local details such as human faces in a screen while monitoring a panorama. The patents CN208094671U and CN208094669U both provide a binocular camera, and the camera includes an upper chamber and a lower chamber, and the upper chamber and the lower chamber are completely independent sealed cavities. The lower chamber is a fixed-focus lens for panoramic monitoring. A maximum angle of view of the lens is 120 degrees, so that the monitoring area is still greatly restricted. The upper chamber is a zoom lens configured to capture details. A maximum angle of view of the zoom lens is 70 degrees. The zoom lens can only be rotated along a single direction, such as vertical up and down rotation or horizontal left and right rotation. Thereby, the zoom lens cannot be used to fully track the monitoring scope of fixed focus lens.

Therefore, it is necessary to provide a new double chamber camera to solve at least one of the above-mentioned shortcomings of the existing binocular camera.

SUMMARY

According to a first aspect of the present disclosure, a double chamber camera is provided, including: a housing having an upper chamber and a lower chamber; and an upper chamber assembly arranged in the upper chamber, and a lower chamber assembly arranged in the lower chamber; the upper chamber assembly includes a first monitoring lens and a first transmission module; the first monitoring lens is a zoom lens; the first transmission module includes a first support and a second support rotatably matched with the first support, a first driving unit configured to drive the first support to rotate along a first direction, and a second driving unit configured to driving the second support to rotate along a second direction; the first monitoring lens is fixed on the first support or the second support.

According to a second aspect of the present disclosure, a double chamber camera is provided, including: a housing having an upper chamber and a lower chamber; an upper chamber assembly arranged in the upper chamber and including: a first monitoring lens; a first support rotatable along a first direction; and a second support arranged above the first support, rotatable along a second direction; and a lower chamber assembly arranged in the lower chamber; the first monitoring lens is fixedly arranged on the second support; when the first support rotates along the first direction, the first monitor lens and the second support are driven to rotate together along the first direction along with the first support; and when the second support rotates along the second direction, the first monitoring lens is driven to rotate along the second direction.

According to a third aspect of the present disclosure, a double chamber camera is provided, including: a housing having a first chamber and a second chamber adjacent to the first chamber; a first chamber assembly arranged in the first chamber and including: a zoom lens; a first support rotatable along a first direction; and a second support arranged on the first support and having a first state in which the second support is rotated along with the first support along the first direction and a second state in which the second support is rotated relative to the first support along a second direction perpendicular to or inclined to the first support; and a second chamber assembly arranged in the second chamber and including at least two fixed-focus lenses; the zoom lens is fixedly arranged on the second support, in response to the second support being in the first state, the zoom lens is driven to rotate along the first direction, and in response to the second support being in the second state, the zoom lens is driven to rotate the second direction.

Figure 1:
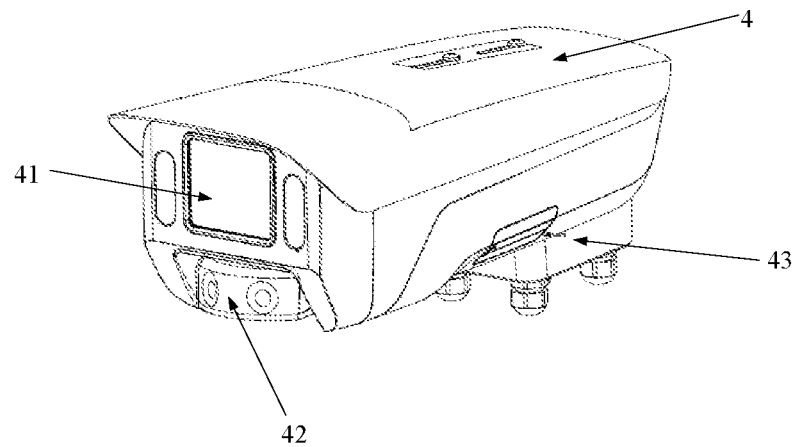
FIG. 1 is a whole structure illustration of a double chamber camera in accordance with an embodiment in the present disclosure.

Labels: 100, double chamber camera; 1, lower chamber assembly; 10, lower chamber; 11, panoramic front cover; 121, second rotation shaft; 122, second rotation shaft damper; 13, front and rear cover sealing screw; 14, second monitoring lens; 15, sealing ring; 16, panoramic back cover; 17, third motor; 18, lens indication; 2, right support base; 21, oil sealing pressure plate; 22, oil sealing; 23, right support base housing; 24, second fluted disc; 25, bearing; 26, side sealing ring of right support base; 27, shaft sealing pressure plate; 4, housing; 40, rear cylinder cavity; 41, first window; 42, second window 43, junction box; 44, transmission hole; 46, upper chamber bottom plate; 47, waterproof and breathable membrane installation position; 48, waterproof joint; 6, upper chamber assembly; 60, upper chamber; 61, fixing support; 62, central gear; 631, first motor; 632, second motor; 64, first support; 641, first bottom wall; 642, first side wall; 643, second side wall; 644, groove; 65, first monitoring lens; 661, first rotating shaft; 662, first rotating shaft damper; 67, first fluted disc; 68, rotating shaft cover; 69, second support; 691, first top wall; 692, third side wall; 693, fourth side wall.

DETAILED DESCRIPTION

The detailed description set forth below is intended as a description of the subject technology with reference to the appended figures and embodiments. It is understood that the embodiments described here include merely some parts of the embodiments of the present disclosure, but do not include all the embodiments. Based on the embodiments of the present disclosure, all other embodiments that those skilled in the art may derive from these embodiments are within the scope of the present disclosure.

Terms such as "first", "second", and the like are used herein for purposes of description, and are not intended to indicate or imply relative importance or significance or to imply the number of indicated technical features. Thus, the feature defined with "first", "second", and the like may include one or more of such a feature. In the description of the present disclosure, "a plurality of" means two or more, such as two, three, and the like, unless specified otherwise. All the directional indications (such as up, down, left, right, front, back . . . ) in the embodiments of the disclosure are only used to explain the relative positional relationship, movement, and so on, between the components in a particular posture (as shown in the figure). When the specific posture changes, the directional indication changes accordingly. In addition, terms "including" and "having" and any variations thereof are intended to cover non-exclusive inclusion.

Reference throughout this specification, the reference terms "an embodiment", "some embodiments", "one embodiment", "another example", "an example", "a specific example", or "some examples", and the like means that a specific feature, structure, material, or characteristic described in connection with the embodiment or example is included in at least one embodiment or example of the present disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples. In addition, one skilled in the art may combine the different embodiments or examples described in this specification and features of different embodiments or examples without conflicting with each other.

Figure 2:
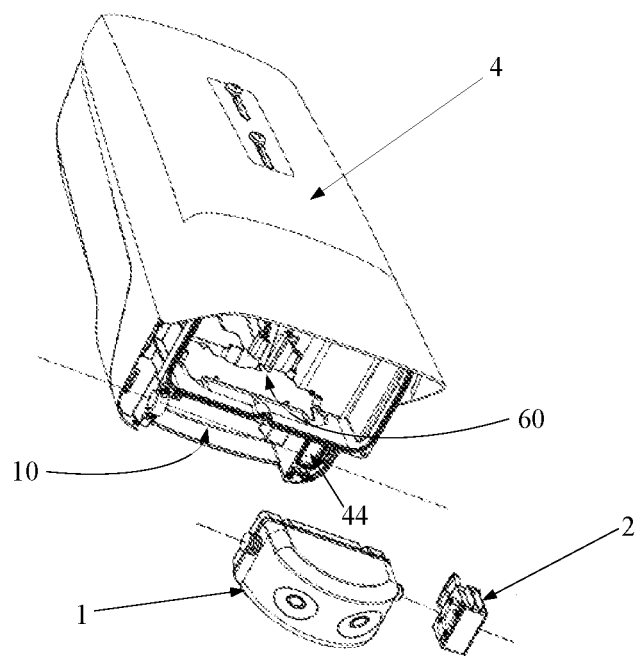
FIG. 2 is a structure illustration of a lower chamber assembly installed in a lower chamber in accordance with an embodiment in the present disclosure.
Figure 3:
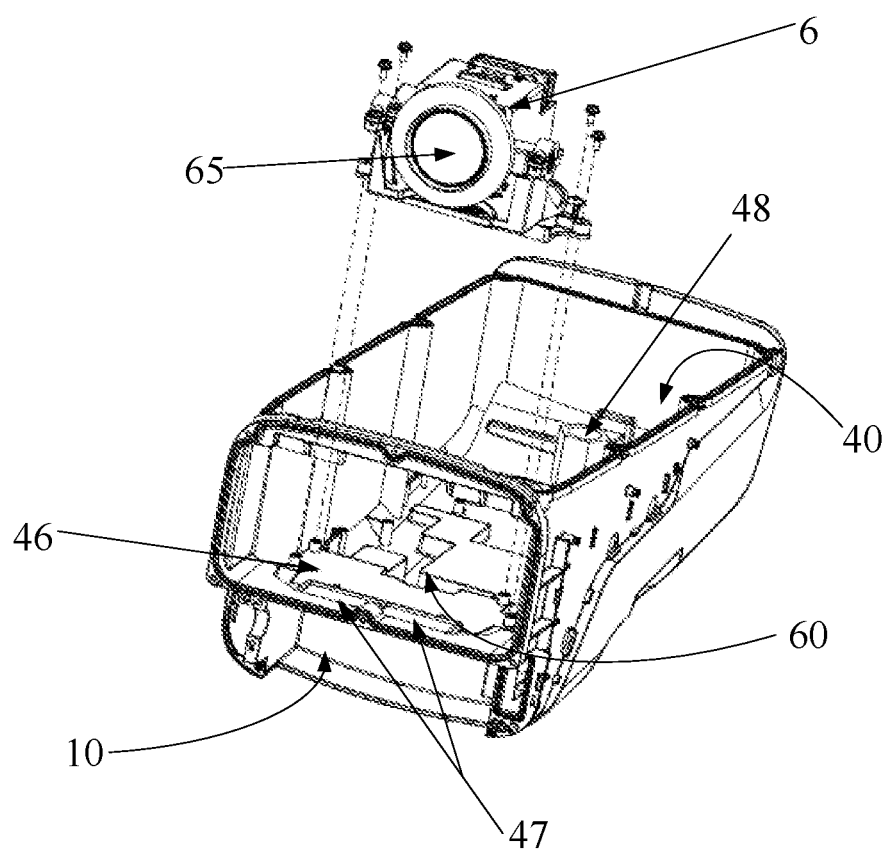
FIG. 3 is a structure illustration of an upper chamber assembly installed in an upper lower chamber in accordance with an embodiment in the present disclosure.

The present disclosure provides a double chamber camera as shown in FIGS. 1-3. The double chamber camera 100 may include a housing 4 having an upper chamber 60 and a lower chamber 10, an upper chamber assembly 6 arranged in the upper chamber 60, and a lower chamber assembly 1 arranged in the lower chamber 10. The upper chamber assembly 6 may include a first monitoring lens 65 and a first transmission module. The first monitoring lens 65 may be a zoom lens. The first transmission module may include a first support and a second support rotatably matched with the first support, a first driving unit configured to drive the first support to rotate along a first direction, and a second driving unit configured to driving the second support to rotate along a second direction. The first monitoring lens 65 may be fixed on the first support or the second support. By the above-method structure, the first monitoring lens 65 may simultaneously realize the rotation along the first and second directions, and the field of view may be adjusted flexibly, and it may better cooperate with the fixed focus lens for detail processing and capture.

In an embodiment of the present disclosure, the first support may be arranged above the second support. The first monitor lens 65 may be fixedly arranged on the first support. When the first support rotates along the first direction, the first monitor lens 65 may be driven to rotate along the first direction. When the second support rotates along the second direction, the first monitor lens 65 and the first support may be driven to rotate together along the second direction. Thereby, the first monitor lens 65 may simultaneously rotate along the first and second directions.

Figure 5:
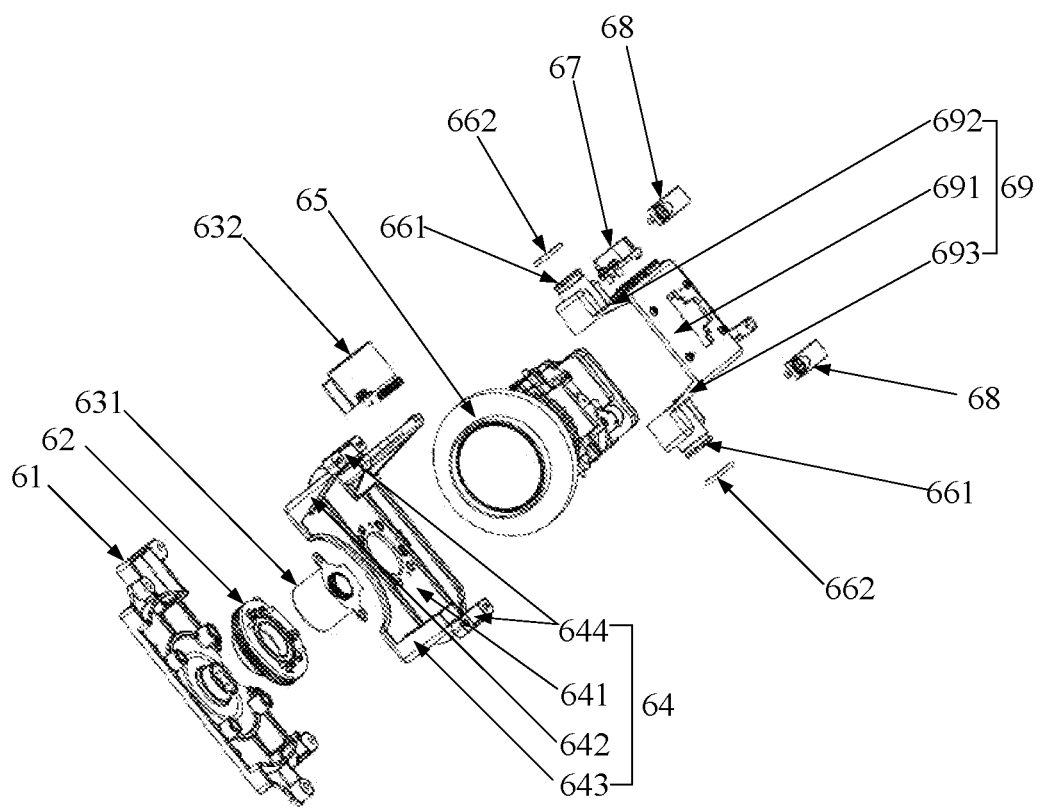
FIG. 5 is an exploded structure illustration of an upper chamber assembly in accordance with an embodiment in the present disclosure.

In an embodiment of the present disclosure, as shown in FIG. 5, the second support 69 may be arranged above the first support 64. The first monitor lens 65 may be fixedly arranged on the second support 69. When the first support 64 rotates along the first direction, the first monitor lens 65 and the second support 69 may be driven to rotate together along the first direction. When the second support 69 rotates along the second direction, the first monitoring lens 65 may be driven to rotate along the second direction. Thereby, the first monitoring lens 65 may simultaneously rotate along the first and second directions.

Optionally, the first direction and the second direction may be perpendicular to each other. For example, the first direction may be a horizontal direction, and the second direction may be a vertical direction, i.e., the first driving unit may drive the first support to rotate left and right along the horizontal direction, and the second driving unit may drive the second support to rotate up and down along the vertical direction. The first direction may be also a vertical direction, and the second direction may be a horizontal direction, i.e., the first driving unit may drive the first support to rotate up and down along the vertical direction, and the second driving unit may drive the second support to rotate left and right along the horizontal direction.

Optionally, an angle of the first monitoring lens 65 rotating along the first direction may be in a range of −5 to 5 degree, and an angle of the first monitoring lens 65 rotating along the second direction may be in a range of −5 to 5 degrees, i.e., the angle of the first monitoring lens 65 rotating horizontally left and right or vertically up and down may be in a range of −5 to 5 degrees.

Optionally, an angle of view of the first monitoring lens 65 may be in a range of 30 to 45 degrees, for example, 40 degrees.

Referring to FIG. 3 and FIG. 5, in another embodiment, the upper chamber assembly 6 may further include a fixing support 61. After the upper chamber assembly 6 is assembled, the assembled upper chamber assembly 6 may be fixed to an upper chamber bottom plate 46 in the upper chamber 60, by screws passing threaded holes on the fixing support 61. The first support 64 may include a first bottom wall 641 arranged in parallel and spaced apart from an upper surface of the fixing support 61, and a first side wall 642 extending from both side edges of the first bottom wall 641 in a direction perpendicular to the first bottom wall 641 and a second side wall 643. The second support 69 may include a first top wall 691, a third side wall 692 and a fourth side wall 693 extending from both sides of the first top wall 691 in a direction close to the fixing support 61 and perpendicular to the first top wall 691.

A first rotating shaft 661 may be respectively arranged on the third side wall 692 and the fourth side wall 693. Rotation axes of the two first rotation shafts 661 may be coincided and be parallel to the first top wall 691. The first side wall 642 and the second side wall 643 may symmetrically define a groove 644. The upper chamber assembly 6 may also include two rotating shaft covers 68 respectively fixedly coupled to the corresponding grooves 644. The two rotating shaft covers 68 may cooperate with the corresponding grooves 644 to form through holes. The two first rotating shafts 661 may respectively rotate in the corresponding through holes, so that rotational cooperation between the second support 69 and the first support 64 may be realized.

The first monitoring lens 65 may be fixed on the first top wall 691. The first monitoring lens 65 may be arranged between the first support 64 and the second support 69. The first driving unit may include a central gear 62 fixedly arranged on the upper surface of the fixing support 61, and a first motor 631 fixedly arranged on the first bottom wall 641. The first motor 631 may be couple to the central gear 62 in a transmission connection, to drive the first support 64 to rotate horizontally left and right. Thereby, the first monitoring lens 65 and the second support 69 may be driven to rotate horizontally left and right. The second driving unit may include a second motor 632 fixedly arranged on the first side wall 642, and a first fluted disc 67 fixedly arranged on the third side wall 692. The second motor 632 may be coupled to the first fluted disc 67 in a transmission connection, to drive the second support 69 to rotate vertically up and down. Thereby, the first monitoring lens 65 may be driven to rotate vertically up and down. The upper chamber assembly 6 may also include first rotating shaft dampers 662 respectively sleeved on both ends of the two first rotating shafts 661. Stability during gear transmission may be effectively ensured.

In the double chamber camera 100 provided in the present disclosure, the lower chamber assembly 1 may include a second monitoring lens. The second monitoring lens may include at least two fixed-focus lenses. Fields of view of the two fixed focus lenses may not overlap at least partially. Comparing with a single fixed-focus lens, a field of view of the second monitoring lens may be expanded, by combining at least two fixed-focus lenses to form the second monitoring lens. For example, in this embodiment, the second monitoring lens 14 may be a dual fixed-focus combined lens, so that scene monitoring in a range of 0 to 180 degrees may be realized. In other embodiments, the second monitoring lens 14 may also be designed as a three-focus combined lens, or a four-focus combined lens, and so on. Overlapped area of field of view of each fixed-focus lens may be adjusted according to actual conditions to meet requirements for a larger field of vision monitoring range.

Figure 4:
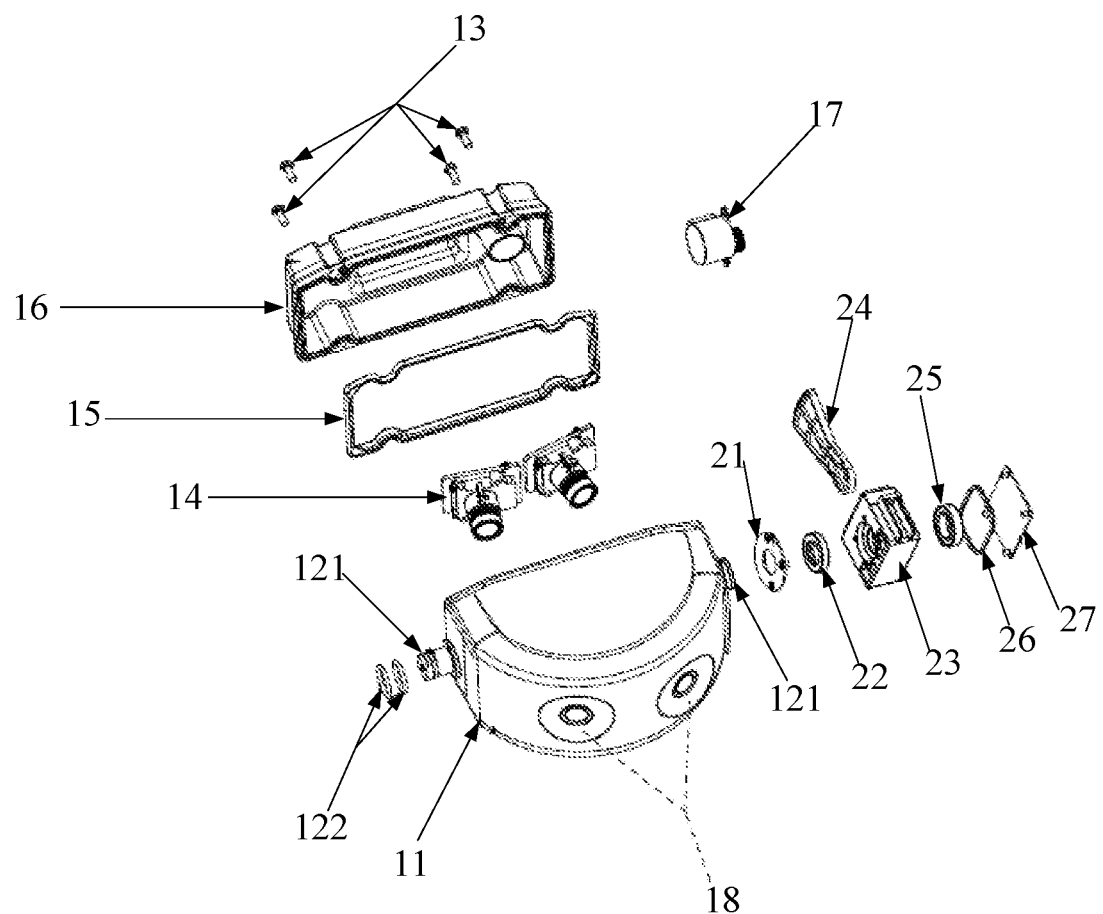
FIG. 4 is an exploded structure illustration of a lower chamber assembly in accordance with an embodiment in the present disclosure.

Referring to FIG. 2 and FIG. 3, in an embodiment, the housing 4 may also have a rear cylinder cavity 40 extending rearward along the lower chamber 10. The rear cylinder cavity 40 may be located below the upper chamber 60 and extend to the upper chamber 60. Referring to FIG. 4, the lower chamber assembly 1 may also include a panoramic front cover 11, a sealing ring 15, a panoramic rear cover 16, a front and rear cover sealing screw 13, a second transmission module, and two second rotation axes fixed on left and right sides of the panoramic front cover 11. Rotation axes of the two second rotation shafts 121 may be coincided. The panoramic front cover 11 and the panoramic rear cover 16 may be sealed and cooperated with each other through the sealing ring 15 and the front and rear cover sealing screw 13 to form a lens cavity. The second monitoring lens 14 may be arranged in the lens cavity. The second transmission module may include a right support base 2 located on a right side of the panoramic front cover 11 and a third motor 17 located in the rear cylinder cavity 40. The third motor 17 may be located in the rear cylinder cavity 40 to reduce a space requirement required by the lower chamber assembly 1. After assembling the lower chamber body assembly 1 is completed, the lower chamber assembly 1 may be positioned in the lower chamber 10 by the second rotating shaft 121 located on the left side of the panoramic front cover 11 and the right support base 2 located on the right side of the panoramic front cover 11.

Referring to FIG. 4, the right support base 2 may include a right support base housing 23, a bearing 25 fixedly arranged inside the right support base housing 23, and a second fluted disc 24 fixedly arranged on the right support base housing 23. The right support base housing 23 may be sleeved and coupled to the second rotating shaft 121 on the right side of the panoramic front cover 11 through the bearing 25. The second fluted disc 24 may be coupled to the third motor 17 in a transmission connection, through a transmission hole 44 on the housing 4, to drive the lens cavity to rotate vertically up and down. Thereby, the second monitoring lens 14 may be driven to rotate vertically up and down. Optionally, an angle of the second monitoring lens 14 rotating vertically up and down may be in a range of −15 to 15 degrees. In order to ensure stability of the lower chamber assembly 1 during the rotation process, a second rotation shaft damper 122 may be sleeved on the second rotation shaft 121 located on the left side of the panoramic front cover 11. The right support base 2 may further include an oil sealing 22 and an oil sealing pressure plate 21 arranged sequentially on a side of the right support base housing 23 close to the panoramic front cover 11, and a side sealing ring 26 of right support base and a shaft sealing pressure plate 27 arranged sequentially on the right support base housing 23 on the side away from the panoramic front cover 11. By arranging the oil sealing 22 and the side sealing ring 26 of right support seat, sealing effect of the right support base 2 may be improved.

In the present disclosure, as shown in FIG. 3, two waterproof and breathable membrane installation positions 47 may be provided on the upper chamber bottom plate 46 to prevent water from accumulating in the upper chamber 60. A waterproof joint 48 may be provided at a cable outlet in an inner cavity of the rear cylinder cavity 40. The cable outlet may be couple to a junction box 43, so that sealing effect may be ensured.

In the present disclosure, as shown in FIG. 1, the double chamber camera 100 may also have a first window 41 and a second window 42. The first window 41 may be a square window and the second window 42 may be a panoramic window. Referring to FIG. 4, the second window 42 may show a lens indication 18. It should be noted that, basis for setting a shape and a size of the first window 41 and the second window 42 is that, during a lens imaging process, there may be no black borders on an image, i.e., during a normal imaging process, edges of the first window 41 and the second window 42 may not appear on a final acquired image.

A distance between a front end of the first monitoring lens 65 and the first window 41 may be required to be within a rotation angle range of a lens assembly. The lens assembly may not touch the window and a field of view may not exceed a range of the window. The second window 42 may be a panoramic window, and the second window 42 may be a shape of a square, an arc, a circular, and so on. Forms shown in this embodiment is only a schematic structure of an embodiment, and is not limited the scope of patent protection.

In other embodiments, three infrared lamp cups may be arranged on both sides of the first window 41. The setting of the infrared lamp cups may be only an alternative embodiment of the present disclosure, and is not a restriction on a number and position of supplementary light. The selection and arrangement of other similar supplementary light types should be regarded as within the protection scope of the present disclosure.

According to a first aspect of the present disclosure, a double chamber camera is provided, including: a housing having an upper chamber and a lower chamber; and an upper chamber assembly arranged in the upper chamber, and a lower chamber assembly arranged in the lower chamber; the upper chamber assembly includes a first monitoring lens and a first transmission module; the first monitoring lens is a zoom lens; the first transmission module includes a first support and a second support rotatably matched with the first support, a first driving unit configured to drive the first support to rotate along a first direction, and a second driving unit configured to driving the second support to rotate along a second direction; the first monitoring lens is fixed on the first support or the second supports.

In some embodiments, the lower chamber assembly includes a second monitoring lens; the second monitoring lens includes at least two fixed-focus lenses; and fields of view of the at least two fixed-focus lenses are overlapped at least partially.

In some embodiments, the first direction and the second direction are perpendicular to each other; an angle range of the first monitor lens rotating along the first direction is in a range of −5 to 5 degrees; and an angle range of the second monitor lens rotating along the second direction is in a range of −5 to 5 degrees.

In some embodiments, an angle of view of the first monitoring lens is in a range of 30 to 45 degrees.

In some embodiments, the second support is arranged above the first support, and the first monitoring lens is fixedly arranged on the second support.

In some embodiments, the upper chamber assembly further includes a fixing support configured to fix the first monitoring lens and the first transmission module in the upper chamber; the first support includes a first bottom wall arranged in parallel and spaced apart from an upper surface of the fixing support; the first driving unit includes a central gear fixedly arranged on the upper surface of the fixing support, and a first motor fixedly arranged on the first bottom wall; and the first motor is coupled to the central gear in a transmission connection, to drive the first support to rotate horizontally left and right.

In some embodiments, the first support further includes a first side wall and a second side wall extending from both side edges of the first bottom wall in a direction perpendicular to the first bottom wall; the second driving unit includes a second motor on the first side wall and a first fluted disc fixedly arranged on the second support; and the second motor is couple to the first fluted disc in a transmission connection, to drive the second support to rotate vertically up and down.

In some embodiment, the second support includes a first top wall, a third side wall, and a fourth side wall extending from both side edges of the first top wall in a direction close to the fixing support and perpendicular to the first top wall; the first fluted disc is fixed on the third side wall; and the first monitoring lens is fixed on the first top wall, and arranged between the first support and the second support.

In some embodiments, the third side wall and the fourth side wall are respectively provided with a first rotating shaft, and rotating axes of the two first rotating shafts are coincided and parallel to the first top wall; grooves are symmetrically defined on the first side wall and the second side wall; the upper chamber assembly further includes two rotating shaft covers respectively fixedly coupled to the corresponding grooves; the rotating shaft covers and the grooves cooperate with each other to form through holes; and the two first rotating shafts are configured to respectively rotate in the corresponding through holes.

In some embodiments, the upper chamber assembly further includes first rotating shaft dampers respectively sleeved on both ends of the first rotating shaft.

In some embodiments, the lower chamber assembly further includes: a panoramic front cover, a panoramic rear cover, and a second transmission module; the panoramic front cover and the panoramic rear cover are sealed and matched with each other to form a lens cavity; the second monitoring lens is arranged in the lens cavity.

In some embodiments, left and right sides of the panoramic front cover are respectively provided with two second rotation shaft; rotation axes of the two second rotation shafts are coincided; the second transmission module includes a right support base arranged on a right side of the panoramic front cover and a third motor arranged outside the lens cavity; the right support base includes a right support base housing, a bearing fixedly arranged inside the right support base housing, and a second fluted disc fixedly arranged on the right support base housing; the right support base housing is sleeved and coupled to the second rotation shaft located on the right side of the panoramic front cover through the bearing; and the second fluted disc is couple to the third motor in a transmission connection, to drive the lens cavity to rotate vertically up and down.

In some embodiments, the housing further includes a rear cylinder cavity extending rearward along the lower chamber, the rear cylinder cavity is located below the upper chamber and extends to the upper chamber, and third motor is arranged in the rear cylinder cavity.

In some embodiments, a second rotating shaft damper is sleeved on the second rotating shaft on a left side of the panoramic front cover.

In some embodiments, an angle range of the second monitoring lens rotating along a direction of up and down is in a range of −15 to 15 degrees.

In some embodiments, the right support base further includes an oil sealing and an oil sealing pressure plate arranged sequentially on the right support base housing at a side of close to the panoramic front cover; the right support base further includes a side sealing ring and a shaft sealing pressure plate arranged sequentially on the right support base housing at a side away from the panoramic front cover.

In some embodiments, the double chamber camera further including a first window and a second window, wherein the first window and the second window includes edges which are configured to be absent on an image acquired by the double chamber camera.

In some embodiments, a front end of the first monitoring lens keeps a distance from the first window, such that the first monitoring lens is out of contact with the first window within a rotation angle range of the first window.

According to a second aspect of the present disclosure, a double chamber camera is provided, including: a housing having an upper chamber and a lower chamber; an upper chamber assembly arranged in the upper chamber and including: a first monitoring lens; a first support rotatable along a first direction; and a second support arranged above the first support, rotatable along a second direction; and a lower chamber assembly arranged in the lower chamber; the first monitoring lens is fixedly arranged on the second support; when the first support rotates along the first direction, the first monitor lens and the second support are driven to rotate together along the first direction along with the first support; and when the second support rotates along the second direction, the first monitoring lens is driven to rotate along the second direction.

According to a third aspect of the present disclosure, a double chamber camera is provided, including: a housing having a first chamber and a second chamber adjacent to the first chamber; a first chamber assembly arranged in the first chamber and including: a zoom lens; a first support rotatable along a first direction; and a second support arranged on the first support and having a first state in which the second support is rotated along with the first support along the first direction and a second state in which the second support is rotated relative to the first support along a second direction perpendicular to or inclined to the first support; and a second chamber assembly arranged in the second chamber and including at least two fixed-focus lenses; the zoom lens is fixedly arranged on the second support, in response to the second support being in the first state, the zoom lens is driven to rotate along the first direction, and in response to the second support being in the second state, the zoom lens is driven to rotate the second direction.

The above are only implementations of the present disclosure, and do not limit the scope of the present disclosure. Any equivalent structure or equivalent process transformation made by the description and drawings of the present disclosure, or directly or indirectly applied to other related technical fields, are similarly included in the scope of patent protection of the present disclosure.

The invention claimed is:

1. A double chamber camera, comprising:
   a housing having an upper chamber and a lower chamber; and
   an upper chamber assembly arranged in the upper chamber, and a lower chamber assembly arranged in the lower chamber;
   wherein the upper chamber assembly comprises a first monitoring lens and a first transmission module; the first monitoring lens is a zoom lens; the first transmission module comprises a first support and a second support rotatably matched with the first support, a first driving unit configured to drive the first support to rotate along a first direction, and a second driving unit configured to driving the second support to rotate along a second direction; the first monitoring lens is fixed on the first support or the second support;
   wherein the lower chamber assembly further comprises: a panoramic front cover, a panoramic rear cover, and a second transmission module, the panoramic front cover and the panoramic rear cover are sealed and matched with each other to form a lens cavity, and the second transmission module comprises a first motor configured to drive the lens cavity to rotate vertically up and down; and
   wherein the housing further comprises a rear cylinder cavity extending rearward along the lower chamber, the rear cylinder cavity is located below the upper chamber and extends to the upper chamber, and the first motor is arranged in the rear cylinder cavity.

2. The double chamber camera as claimed in claim 1, wherein
   the lower chamber assembly comprises a second monitoring lens;
   the second monitoring lens comprises at least two fixed-focus lenses; and
   fields of view of the at least two fixed-focus lenses are overlapped at least partially.

3. The double chamber camera as claimed in claim 1, wherein
   the first direction and the second direction are perpendicular to each other;
   an angle range of the first monitoring lens rotating along the first direction is in a range of −5 to 5 degrees; and
   an angle range of the first monitoring lens rotating along the second direction is in a range of −5 to 5 degrees.

4. The double chamber camera as claimed in claim 1, wherein an angle of view of the first monitoring lens is in a range of 30 to 45 degrees.

5. The double chamber camera as claimed in claim 1, wherein
   the second support is arranged above the first support, and
   the first monitoring lens is fixedly arranged on the second support.

6. The double chamber camera as claimed in claim 5, wherein the upper chamber assembly further comprises a fixing support configured to fix the first monitoring lens and the first transmission module in the upper chamber;
   the first support comprises a first bottom wall arranged in parallel and spaced apart from an upper surface of the fixing support;
   the first driving unit comprises a central gear fixedly arranged on the upper surface of the fixing support, and a second motor fixedly arranged on the first bottom wall; and
   the second motor is coupled to the central gear in a transmission connection, to drive the first support to rotate horizontally left and right.

7. The double chamber camera as claimed in claim 6, wherein
   the first support further comprises a first side wall and a second side wall extending from both side edges of the first bottom wall in a direction perpendicular to the first bottom wall;
   the second driving unit comprises a third motor on the first side wall and a first fluted disc fixedly arranged on the second support; and
   the third motor is couple to the first fluted disc in a transmission connection, to drive the second support to rotate vertically up and down.

8. The double chamber camera as claimed in claim 7, wherein
   the second support comprises a first top wall, a third side wall, and a fourth side wall extending from both side edges of the first top wall in a direction close to the fixing support and perpendicular to the first top wall;
   the first fluted disc is fixed on the third side wall; and
   the first monitoring lens is fixed on the first top wall, and arranged between the first support and the second support.

9. The double chamber camera as claimed in claim 8, wherein
   the third side wall and the fourth side wall are respectively provided with a first rotating shaft, and rotating axes of the two first rotating shafts are coincided and parallel to the first top wall;
   grooves are symmetrically defined on the first side wall and the second side wall;
   the upper chamber assembly further comprises two rotating shaft covers respectively fixedly coupled to the corresponding grooves;
   the rotating shaft covers and the grooves cooperate with each other to form through holes; and
   the two first rotating shafts are configured to respectively rotate in the through holes.

10. The double chamber camera as claimed in claim 9, wherein
    the upper chamber assembly further comprises first rotating shaft dampers respectively sleeved on both ends of the first rotating shaft.

11. The double chamber camera as claimed in claim 1, wherein
    the second monitoring lens is arranged in the lens cavity.

12. The double chamber camera as claimed in claim 11, wherein left and right sides of the panoramic front cover are respectively provided with two second rotation shafts; rotation axes of the two second rotation shafts are coincided; the second transmission module comprises a right support base arranged on a right side of the panoramic front cover and the third motor is arranged outside the lens cavity; the right support base comprises a right support base housing, a bearing fixedly arranged inside the right support base housing, and a second fluted disc fixedly arranged on the right support base housing; the right support base housing is sleeved and coupled to the second rotation shaft located on the right side of the panoramic front cover through the bearing; and the second fluted disc is couple to the third motor in a transmission connection, to drive the lens cavity to rotate vertically up and down.

13. The double chamber camera as claimed in claim 12, wherein
a second rotating shaft damper is sleeved on the second rotating shaft on a left side of the panoramic front cover.

14. The double chamber camera as claimed in claim 12, wherein
an angle range of the second monitoring lens rotating along a direction of up and down is in a range of −15 to 15 degrees.

15. The double chamber camera as claimed in claim 12, wherein the right support base further comprises an oil sealing and an oil sealing pressure plate arranged sequentially on the right support base housing at a side of close to the panoramic front cover;
the right support base further comprises a side sealing ring and a shaft sealing pressure plate arranged sequentially on the right support base housing at a side away from the panoramic front cover.

16. The double chamber camera as claimed in claim 1, further comprising a first window and a second window, wherein the first window and the second window comprises edges which are configured to be absent on an image acquired by the double chamber camera.

17. The double chamber camera as claimed in claim 16, wherein a front end of the first monitoring lens keeps a distance from the first window, such that the first monitoring lens is out of contact with the first window within a rotation angle range of the first window.

18. A double chamber camera, comprising:
a housing having an upper chamber and a lower chamber;
an upper chamber assembly, arranged in the upper chamber and comprising:
a first monitoring lens;
a first support, rotatable along a first direction; and
a second support, arranged above the first support, rotatable along a second direction; and
a lower chamber assembly, arranged in the lower chamber;
wherein the first monitoring lens is fixedly arranged on the second support;
when the first support rotates along the first direction, the first monitor lens and the second support are driven to rotate together along the first direction along with the first support; and
when the second support rotates along the second direction, the first monitoring lens is driven to rotate along the second direction;
wherein the lower chamber assembly further comprises: a panoramic front cover, a panoramic rear cover, and a second transmission module, the panoramic front cover and the panoramic rear cover are sealed and matched with each other to form a lens cavity, and the second transmission module comprises a first motor configured to drive the lens cavity to rotate vertically up and down; and
wherein the housing further comprises a rear cylinder cavity extending rearward along the lower chamber, the rear cylinder cavity is located below the upper chamber and extends to the upper chamber, and the first motor is arranged in the rear cylinder cavity.

19. A double chamber camera, comprising:
a housing having a first chamber and a second chamber adjacent to the first chamber;
a first chamber assembly, arranged in the first chamber and comprising:
a zoom lens;
a first support, rotatable along a first direction; and
a second support, arranged on the first support and having a first state in which the second support is rotated along with the first support along the first direction and a second state in which the second support is rotated relative to the first support along a second direction perpendicular to or inclined to the first support; and
a second chamber assembly, arranged in the second chamber and comprising at least two fixed-focus lenses;
wherein the zoom lens is fixedly arranged on the second support, in response to the second support being in the first state, the zoom lens is driven to rotate along the first direction, and in response to the second support being in the second state, the zoom lens is driven to rotate the second direction;
wherein the lower chamber assembly further comprises: a panoramic front cover, a panoramic rear cover, and a second transmission module, the panoramic front cover and the panoramic rear cover are sealed and matched with each other to form a lens cavity, and the second transmission module comprises a first motor configured to drive the lens cavity to rotate vertically up and down; and
wherein the housing further comprises a rear cylinder cavity extending rearward along the lower chamber, the rear cylinder cavity is located below the upper chamber and extends to the upper chamber, and the first motor is arranged in the rear cylinder cavity.

* * * * *